March 5, 1957
B. V. VONDERSCHMITT
RASTER CENTERING CONTROL
Filed July 2, 1953
2,784,344
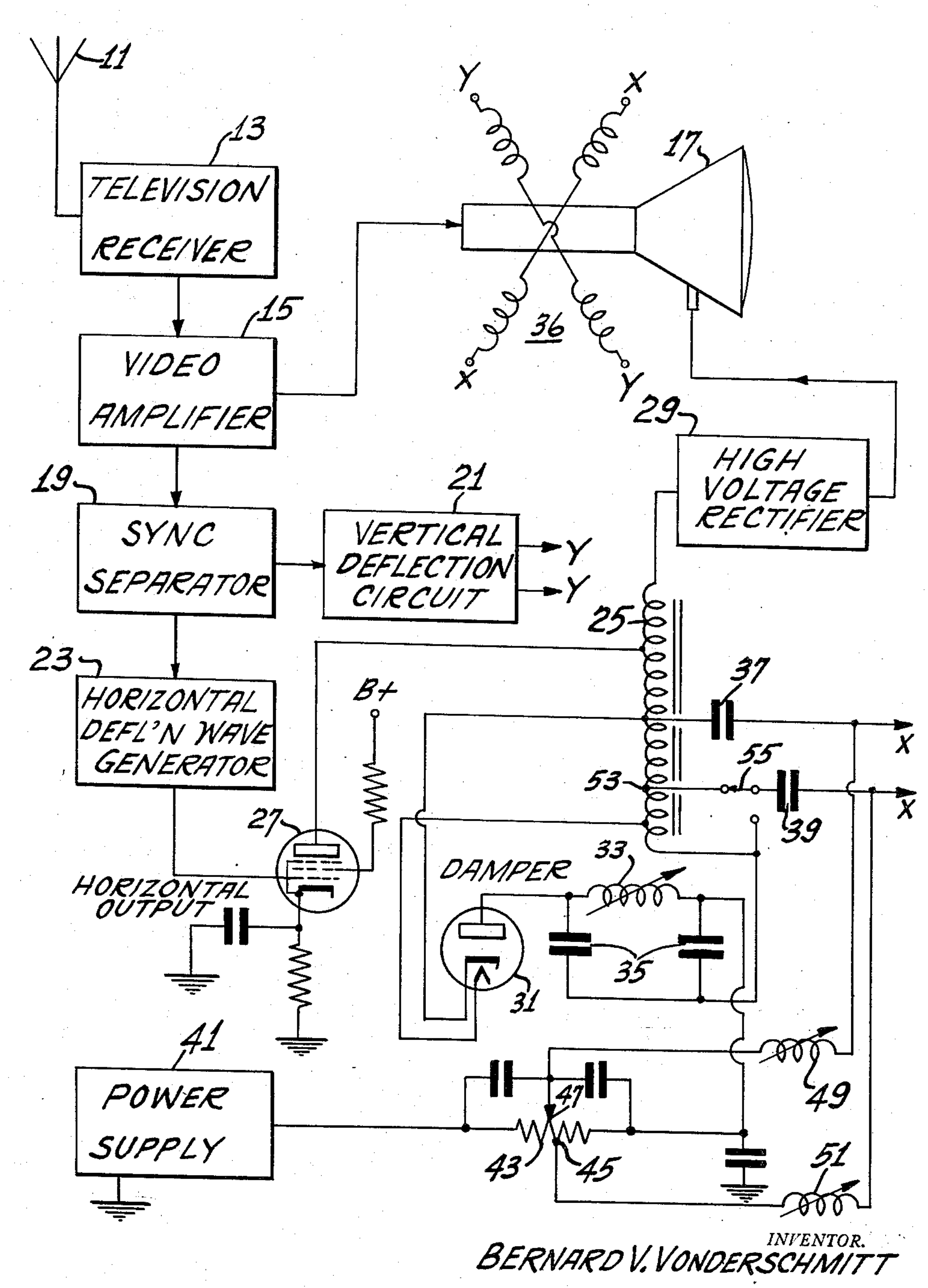
INVENTOR.
BERNARD V. VONDERSCHMITT
BY Lin V. Mitchell
ATTORNEY United States Patent Office 2,784,344

Patented Mar. 5, 1957

2,784,344

RASTER CENTERING CONTROL

Bernard V. Vonderschmitt, Merchantville, N. J., assignor to Radio Corporation of America, a corporation of Delaware Application July 2, 1953, Serial No. 365,748

7 Claims. (Cl. 315—27)

This invention relates to cathode ray deflection systems, and more particularly to circuits for providing a centering correction for a scanned raster.

In the present television practice, the picture is formed in a cathode ray tube, or kinescope, by an electron beam which traces successive lines forming a raster on a fluorescent screen. The beam is emitted from an electron gun, and is directed onto the fluorescent screen by focusing means such as magnets and by windings of the deflection yoke. Should the beam be improperly directed, the traced raster may not be properly centered on the fluorescent screen. Centering adjustments have been made by altering the physical relationship of the focusing magnets and deflection yoke as they are positioned around the neck of the cathode ray tube. Centering has been accomplished electrically by inserting direct current into the deflection circuit and the deflection winding of the yoke, but this has the detrimental effect of saturating the core material of the output transformer.

It is an object of this invention to provide an improved means for centering a raster in a kinescope without resorting to the physical adjustments of realigning the focusing magnets and the yoke.

A further object is to provide a novel circuit which will serve as both a raster size control and a raster centering control.

A further object is to provide a new and improved centering means for adding direct current to the deflection windings of the yoke without adversely affecting the remainder of the deflection circuit by saturating the core material of the output transformer.

According to this invention, a direct current of a variable magnitude for raster centering is impressed across the deflection windings. Means having a high D.-C. impedance, such as blocking condensers, isolate the output transformer from direct current flow. Means having a high A.-C. impedance, such as choke coils, isolate the direct current source from alternating current flow. The choke coils form an inductive path shunting a portion of the output transformer and may serve as a width control.

Other objects of this invention will become apparent upon a reading of the following specification and an inspection of the accompanying drawing which is a circuit diagram, partially schematic, of a television receiving system including a deflection circuit involving the present invention.

Referring to the drawing, television signals picked up by antenna 11 are amplified by the television receiver 13 which includes a radio frequency amplifier, a converter, an intermediate frequency amplifier, and a sound channel. These signals are amplified by the video amplifier 15 and are impressed upon a kinescope 17. The synchronizing pulses of the composite signal are separated by the synchronizing signal separator 19 which feeds these pulses to the vertical deflection circuit 21 and the horizontal deflection wave generator 23. The vertical deflection winding of the yoke 36 is connected to the vertical deflection circuit 21 at points Y—Y. Deflection waves from the horizontal deflection wave generator 23 are impressed upon the horizontal output transformer 25 by means of an output tube 27. The present invention is particularly useful where the output transformer is of the autotransformer type as shown. The high voltage rectifier 29 receives high voltage pulses from the output transformer during the retrace intervals, and supplies the kinescope 17 with its second anode voltage. Oscillations which would appear across the output transformer 25 are damped by the damper tube 31. The plate of the damper tube 31 is connected to a variable inductance 33 and two condensers 35 which form the linearity control. The horizontal deflection winding of the deflection yoke 36 is connected to the deflection circuit at points X—X. Condensers 37 and 39, having a high D.-C. impedance, prevent direct current from flowing between the deflection circuit and the deflection winding of the yoke.

A power supply 41 is connected to the linearity control 33 through a potential-dividing rheostat 43. A direct current potential may be obtained from this potential-dividing rheostat 43 between a tap 45 and a movable rider 47. This potential may be of either positive or negative polarity and may be adjustably varied in magnitude depending upon the position of the rider 47. This direct current potential is applied to the deflection yoke connections at points X—X through two inductive reactors, or choke coils, 49 and 51 having a high A.-C. impedance.

The adjustable direct current obtained from the potential-dividing rheostat 43 is impressed upon the horizontal deflection winding simultaneously with the deflection waves which are developed across the output transformer 25. Direct current is prevented from flowing in the output transformer by the blocking condensers 37 and 39 and this permits an unlimited amount of centering current to flow in the deflection yoke with no saturating effect upon the ferrite core material ordinarily used in the horizontal deflection transformer. This invention is particularly adaptable to deflection circuits employing autotransformers, although it may also be used in circuits having output transformers with multiple windings.

The choke coils 49 and 51 are connected in series together with that portion of the rheostat 43 which is between tap 45 and rider 47. These series connected elements are shunted across the deflection yoke and may be used as a raster size control. By varying the inductance of the coils 49 and 51, the width of the raster may be varied.

Since centering current for the deflection yoke is obtained from a circuit which is effectively isolated from the output transformer 25, it is not necessary that the yoke be coupled to the output transformer at a point of alternating current ground potential. In some cases it is desirable to connect the yoke to a point 53 above ground potential in order to minimize "ringing," or resonant oscillation, in the circuit. A switch 55 is shown in the drawing to indicate either of these alternate connections for coupling the deflection yoke to the output transformer.

It will be noted that the coils 49 and 51 perform the functions of providing a width control for the raster, of introducing direct current into the yoke for centering the raster and of isolating the yoke from alternating current ground potential, thereby permitting the use of alternate connections to the output transformer for minimizing ringing.

Although the foregoing drawing and specification illustrate this invention as it may be used in a horizontal deflection system to achieve horizontal centering of a raster, it will be appreciated that vertical centering could likewise be achieved by using this circuit in connection with the vertical deflection system. It is not intended, therefore, to limit this invention to use only in the horizontal deflection circuit.

The term "television receiver" as it is used in this specification shall be interpreted to include television theater projection systems and studio monitoring systems as well as television receivers of the home instrument type.

What is claimed is:

1. A television receiver including a deflection wave generator for driving a deflection yoke winding for deflecting an electron beam to trace a raster, a capacitor coupling one terminal of said deflection winding to said generator, another capacitor coupling the other terminal of said deflection winding to said generator at a point remote from the first said coupling, a source of direct current adjustable in polarity and magnitude, an inductive winding connecting said one terminal of said deflection winding to said direct current source, and another inductive winding connecting said other terminal of said deflection winding to said direct current source at a point remote from the point of the first said connection.

2. A television receiver as defined in claim 1 and wherein said plurality of inductive windings comprises two inductive choke coils, said choke coils having adjustably variable inductance whereby said choke coils may serve as a size control for said raster.

3. In a television receiver, a circuit for adjustably centering a raster scanned by an electron beam, said circuit comprising a means for generating deflection waves, an output transformer connected to said deflection wave generating means, a deflection yoke coupled to said output transformer, a first blocking condenser connected between a first tap on said output transformer and a first terminal of said deflection yoke, a second blocking condenser connected between a second tap on said output transformer and a second terminal on said deflection yoke, a source of direct current having an adjustable output voltage, a first inductive choke connected between a first terminal of said direct current source and the first terminal of said deflection yoke and a second inductive choke connected between a second terminal of said direct current source and the second terminal of said deflection yoke.

4. In a television receiver having a deflection wave generator coupled to a deflection yoke winding for deflecting an electron beam to trace a raster in a cathode ray tube, a circuit for adjustably centering said raster comprising a direct current power supply, a potential dividing rheostat connected to said power supply, said rheostat having a fixed tap and an adjustable rider, a first inductive choke connected between the fixed tap of said rheostat and a first terminal of said deflection yoke winding, a second inductive choke connected between the adjustable rider of said rheostat and a second terminal of said deflection yoke winding, a first blocking condenser connected between said deflection wave generator and the first terminal of said deflection yoke winding, and a second blocking condenser connected between said deflection wave generator and the second terminal of said deflection yoke winding.

5. In a television receiver, a circuit for deflecting an electron beam to trace a raster in a cathode ray tube, said circuit comprising a means for generating deflection waves, an autotransformer connected to said deflection wave generating means, a deflection yoke winding adapted to fit in close proximity to said cathode ray tube, a first blocking condenser connected between a first tap of said autotransformer and a first terminal of said deflection yoke winding, a second blocking condenser connected between a second tap of said autotransformer and a second terminal of said deflection yoke winding, a direct current power supply, a potential dividing rheostat connected to said power supply, said rheostat having a fixed tap and an adjustable rider, a first inductive choke connected between the fixed tap of said rheostat and the first terminal of said deflection yoke winding, and a second inductive choke connected between the adjustable rider of said rheostat and the second terminal of said deflection yoke winding.

6. A deflection system for a cathode ray tube, including a deflection wave generator having a plurality of output terminals and a deflection winding having two terminals, means having low impedance to alternating current and high impedance to direct current coupling one terminal of said deflection winding to one terminal of said generator, further means having low impedance to alternating current and high impedance to direct current coupling the other terminal of said deflection winding to another terminal of said generator, a source of direct current of adjustable intensity and having a plurality of terminals, means having high impedance to alternating current and low impedance to direct current connecting said one terminal of said deflection winding to one terminal of said direct current source, and further means having high impedance to alternating current and low impedance to direct current coupling said other terminal of said deflection winding to another terminal of said direct current source.

7. A deflection system as defined in claim 6 and wherein said means having high impedance to alternating current and low impedance to direct current are constituted by adjustable inductors.

References Cited in the file of this patent

UNITED STATES PATENTS

| | | |
|---|---|---|
| 2,512,400 | Wendt | June 20, 1950 |
| 2,545,346 | Edelsohn | Mar. 13, 1951 |
| 2,586,521 | Czeropski et al. | Feb. 19, 1952 |
| 2,611,106 | Fyler et al. | Sept. 16, 1952 |
| 2,701,851 | Palmer | Feb. 8, 1955 |